US012107636B2

(12) United States Patent
Van Neste (10) Patent No.: US 12,107,636 B2
(45) Date of Patent: Oct. 1, 2024

(54) SYSTEM AND METHOD FOR GENERATING ELECTRIC BASED NON-LINEAR WAVES IN NATURAL TERRESTRIAL ENVIRONMENTS

(71) Applicant: Tennessee Technological University, Cookeville, TN (US)

(72) Inventor: Charles W. Van Neste, Cookeville, TN (US)

(73) Assignee: TENNESSEE TECHNOLOGICAL UNIVERSITY, Cookeville, TN (US)

(*) Notice: Subject to any disclaimer, the term of this patent is extended or adjusted under 35 U.S.C. 154(b) by 352 days.

(21) Appl. No.: 17/452,258

(22) Filed: Oct. 26, 2021

(65) Prior Publication Data
US 2022/0140917 A1 May 5, 2022

Related U.S. Application Data

(60) Provisional application No. 63/107,575, filed on Oct. 30, 2020.

(51) Int. Cl.
*H04B 13/02* (2006.01)
*H01P 3/00* (2006.01)
*H02J 50/20* (2016.01)

(52) U.S. Cl.
CPC .............. *H04B 13/02* (2013.01); *H01P 3/00* (2013.01); *H02J 50/20* (2016.02)

(58) Field of Classification Search
CPC ............. H04B 13/02; H01P 3/00; H02J 50/20
See application file for complete search history.

(56) References Cited

U.S. PATENT DOCUMENTS 2,389,432 A * 11/1945 Hansell .................. H04B 13/02
340/852
2,901,687 A * 8/1959 Barret .................... H04B 13/02
324/334
(Continued)

FOREIGN PATENT DOCUMENTS

CN 111983704 B * 9/2023 ............... G01V 3/30
JP 2017-143732 8/2017
(Continued)

OTHER PUBLICATIONS

PCT/US2021/072045, International Search Report and Written Opinion, dated Feb. 28, 2022.

*Primary Examiner* — Seokjin Kim
(74) *Attorney, Agent, or Firm* — André J. Bahou; Kristen Strickland; Bradley Arant Boult Cummings LLP (57) ABSTRACT

A system for transmitting electrical signals through a terrestrial body, the terrestrial body having an upper surface, may include a transmitter. The transmitter may include a first electrode positioned proximate the upper surface of the terrestrial body and at least one second electrode positioned beneath the upper surface of the terrestrial body and spaced from the first electrode. The system may include a power source operable to supply power to the first electrode and the at least one second electrode. The system may include a receiver assembly spaced away from the transmitter. When power is supplied to the transmitter, the transmitter may be operable to propagate an electric non-linear wave signal through the terrestrial body. The receiver assembly may be operable to detect the electric non-linear wave signal.

11 Claims, 10 Drawing Sheets

(56) References Cited

U.S. PATENT DOCUMENTS

| | | | |
|---|---|---|---|
| 2004/0008124 A1* | 1/2004 | Schaefer | H04B 13/02 |
| | | | 340/850 |
| 2011/0080050 A1* | 4/2011 | Thundat | H02J 50/12 |
| | | | 307/104 |
| 2014/0159479 A1 | 6/2014 | Nomura et al. | |
| 2016/0285314 A1* | 9/2016 | Van Neste | H02J 50/40 |
| 2017/0302109 A1 | 10/2017 | Lee et al. | |
| 2019/0140766 A1 | 5/2019 | Anlage et al. | |
| 2019/0154635 A1* | 5/2019 | Corum | G01S 13/00 |

FOREIGN PATENT DOCUMENTS

| | | | | |
|---|---|---|---|---|
| KR | 10-2019-0128926 | | 11/2019 | |
| WO | WO-2013016726 A1 * | 1/2013 | | H04B 13/02 |
| WO | WO-2019104117 A1 * | 5/2019 | | G01V 3/20 |

* cited by examiner

SYSTEM AND METHOD FOR GENERATING ELECTRIC BASED NON-LINEAR WAVES IN NATURAL TERRESTRIAL ENVIRONMENTS

CROSS-REFERENCES TO RELATED APPLICATIONS

This application claims priority to U.S. Provisional Patent Application No. 63/107,575, entitled "METHOD AND SYSTEM FOR GENERATING ELECTRIC NON-LINEAR WAVES IN NATURAL TERRESTRIAL ENVIRONMENTS," filed Oct. 30, 2020, and which is incorporated by reference in its entirety.

STATEMENT REGARDING FEDERALLY SPONSORED RESEARCH OR DEVELOPMENT

Research related to the contents of this application were funded in part by National Science Foundation Award Number 1841469.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

REFERENCE TO SEQUENCE LISTING OR COMPUTER PROGRAM LISTING APPENDIX

Not Applicable

BACKGROUND OF THE INVENTION

The present disclosure generally relates to the transmission of electrical signals or electrical power between desired systems or locations. More particularly, the present disclosure relates to the transmission of wireless electrical signals or electrical power over larger distances between two locations.

Conventional systems transfer electrical signals over large distances (i.e., greater than one meter) using wires connecting different systems. However, wired technologies are costly to install and maintain.

Some wireless power systems do exist. Such contemporary wireless power systems propagate electromagnetic (EM) fields from a transmission source to nearby electrical circuitry to induce a current in the nearby circuitry. One application of such contemporary wireless power transfer is charging systems for various electronics such as mobile phones, electric vehicles, and other various applications with rechargeable battery systems. Wireless power transmission can also be utilized to wirelessly power sensors or other electronic devices that can be at remote locations from a power transmission source.

However, even when using these contemporary wireless power solutions, long-distance energy transfer relies on low-efficiency EM space-wave techniques. Both surface and space wave EM propagation waves reduce quickly in amplitude over large distances. As such, in current wireless power transfer systems, the system to which power is transferred must be in close proximity to the transmitting power system. Technology involving the excitation of Zenneck surface waves to improve the attenuation rate of the EM energy, as described in U.S. Pat. No. 9,912,031 to Corum et al., do exist. While a marginal, close-range improvement may be accomplished utilizing these methods, the signal intensities are still limited and are not suited for wireless power transfer over long distances. Furthermore, such techniques are line-of-sight dependent, potentially dangerous to living beings, and prone to interference from environmental factors such as weather or fauna. Some of these issues can be mitigated by increasing the size of the transmitter or receiver. However, this also increases costs and is still susceptible to environmental factors.

What is needed then are improvements in power transmission systems to allow for wireless power transmission over longer distances.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This disclosure provides a system and method for propagating higher amounts of electric energy (relative to electromagnetic space and surface waves) over large distances. This enables the wireless transfer of power to loads in electrical connection (direct, capacitive, inductive) with the geological surface and subsurface. Such systems and methods provide for long-range wireless power transfer that is not line-of-sight dependent, is safe for living beings, and is resistant to environmental interference.

One aspect of the present disclosure is a system for transmitting electrical signals through a terrestrial body having an upper surface. The system can include a transmitter including a first electrode positioned proximate the upper surface of the terrestrial body and a least one second electrode positioned beneath the surface of the terrestrial body and spaced from the first electrode. A power source can be operable to supply power to the first electrode and the at least one second electrode. A receiver assembly can be positioned proximate to or beneath the upper surface of the terrestrial body and spaced from the transmitter. When power is supplied to the transmitter, the transmitter produces an electric non-linear wave signal through the terrestrial body. The electric non-linear wave may be signal detectable by the receiver assembly. The dispersion and nonlinear characteristics of the terrestrial body can cancel one another out as an electrical signal passes through the terrestrial body to produce a propagating "pulse" electrical non-linear wave or signal that can travel over larger distances through the terrestrial body to the receiver assembly. In some embodiments, the non-linear wave can resemble, mimic, or be representative of a soliton wave.

The systems and methods of the present disclosure can be useful in wireless power transmission systems. Because of the increase in the transmission distances achieved, components in wireless power transmission systems can be spaced apart from one another by more than a meter and still be in wirelessly communication with one another via the ground or the terrestrial body. Being able to wirelessly transmit power over longer distances can help remove the need for cumbersome wiring setups that may need to be buried or covered depending on the environment. Additionally, because of the longer transmission range achieved by the systems and methods of the present disclosure, multiple objects to be powered can be spaced apart from one another and still be able to receive the electrical power signals propagated by a single transmitter or fewer transmitters. This can be particularly relevant for larger items such as vehicles or other large objects. In conventional power systems, multiple charging stations are required to charge multiple vehicles simultaneously. The systems and methods of the disclosure, however, can charge multiple vehicles using a single charging station. Furthermore, sensing or monitoring systems can also utilize the power transmission system of the present disclosure to power numerous sensors, monitors, or other detection devices at varying locations and distances from the power transmitter.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Some nonlinear phenomena produce a wave that can propagate over very large distances and with very low attenuation when applied to natural environments (such as the Earth). In a lossy electromagnetic (EM) medium (i.e., a medium that has both a permittivity ($\varepsilon$) and a conductivity ($\sigma$)), the wavenumber (k) becomes a complex value that is dependent on frequency. Thus, waves of different frequencies will propagate at different speeds. This effect is known as dispersion. Geological strata (soil, rock, etc.) is classically known as a lossy dielectric medium. EM waves that are propagated through terrestrial media will therefore suffer from dispersion.

Nonlinear effects are also prevalent in natural environments. One possible cause of the nonlinearity of the Earth comes from the atmosphere. Being a charged plasma, the capacitance the atmosphere makes with respect to the Earth's surface creates a non-linear capacitor (i.e., a capacitor whose value changes with applied voltage). With the surface coupled to the atmosphere, a strong perturbation created at the surface will induce a slight modulation of the sky/surface capacitance. Such a modulation of the plasma has been shown accidently in the Luxembourg Effect of 1933, and purposely in the 1980s by the High Frequency Active Auroral Research Program (HAARP). See also U.S. Pat. No. 4,686,605 to Eastlund. However, both of these demonstrated modulations occurred due to EM energy bombardment from a surface antenna of intense power magnitudes. Other forms of nonlinearity also exist, specifically in soil/rocks, where ionic liquid interactions with applied voltages and currents can create perturbations in ion transport that are dependent on the magnitudes of the applied voltages. One example of this is oxidation-reduction reactions, common in soils with mineral content, which have reaction rate constants that are both exponential and voltage dependent.

If a system possesses both dispersion and non-linearity, it is possible to create a non-linear wave form, or a wave described by a non-linear equation with such a system. One such non-linear wave phenomenon is known as a soliton wave. A soliton wave takes the form of a propagating "pulse" where the normal dispersion effects are canceled by the nonlinearity of the medium. The soliton wave pulses can generally be modelled by the following equation:

$$u(x, t) = A \operatorname{sech}^2\left(\sqrt{\frac{A}{2}}(x - 2At)\right) \quad (1)$$

where A is the current amplitude, x is the spatial coordinate and t is the temporal coordinate.

These waves are special in that they may propagate over very large distances, have a velocity dependent on their amplitude (c=2A as shown in Eq. 1), and do not superimpose with other soliton waves. Instead, they elastically collide (like a particle), reforming back to their original pre-collision amplitudes and widths after crossing. With the Earth supporting both dispersion and non-linearity, the generation of non-linear waves (including soliton waves) can be possible with a strong enough current impulse in the medium.

Figure 1:
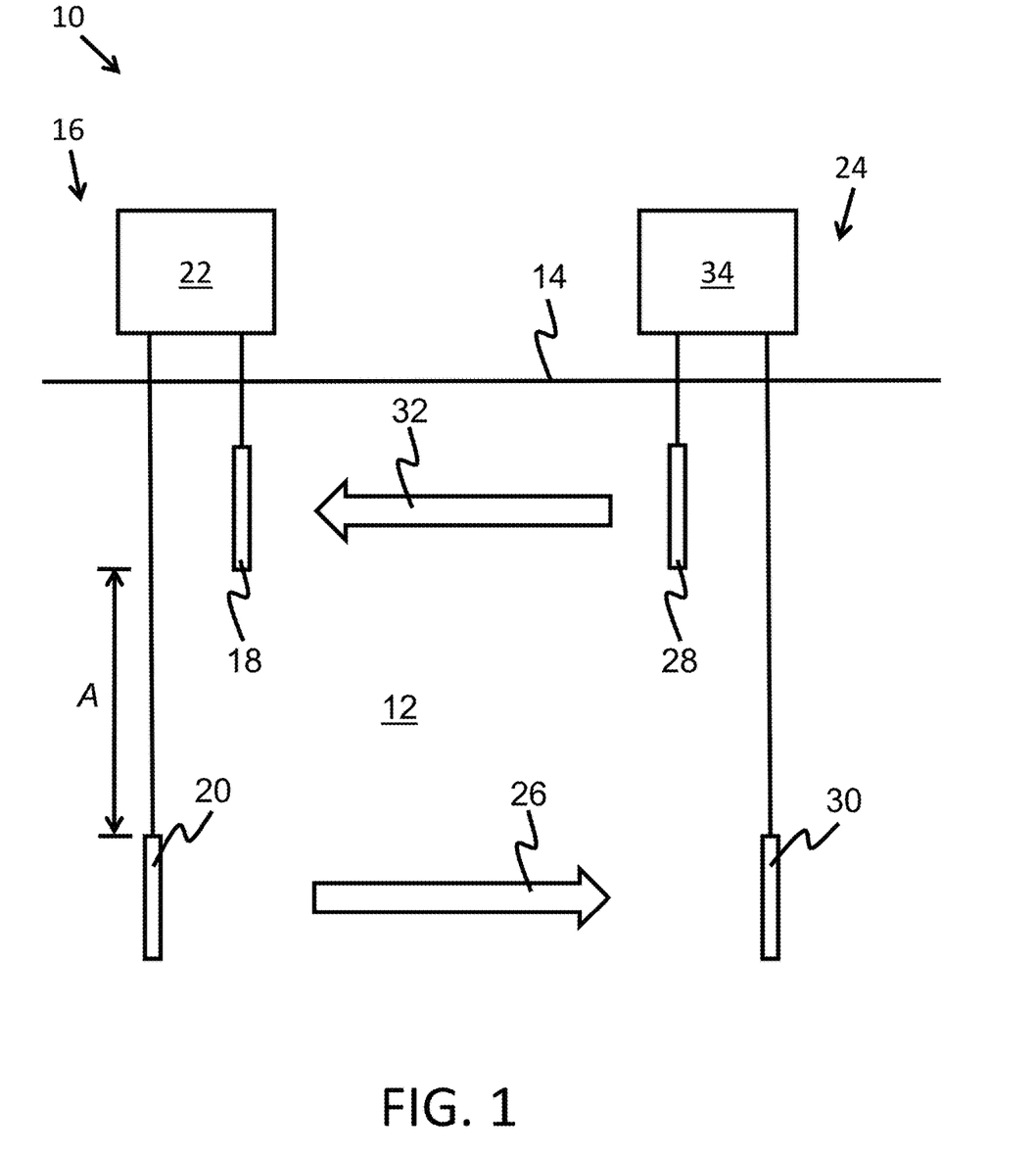
FIG. 1 is a schematic view of one embodiment of a system of transmitting power through a terrestrial body showing a transmitter and receiver of the system.

FIG. 1 depicts one aspect of the present disclosure. FIG. 1 depicts one embodiment of a system 10 for transmitting electrical signals through a terrestrial body 12 having an upper surface 14. The system 10 can include a transmitter 16. The transmitter 16 may include a first electrode 18 positioned proximate the upper surface 14 of the terrestrial body 12 and a least one second electrode 20 positioned beneath the upper surface 14 of the terrestrial body 12 and spaced from the first electrode 18. A power source 22 can be operable to supply power to the first electrode 18 and the at least one second electrode 20. A receiver assembly 24 can be positioned proximate to or beneath the upper surface 14 of the terrestrial body 12 and spaced from the transmitter 16. When power is supplied to the transmitter 16, the transmitter 16 produces an electric non-linear wave signal 26 through the terrestrial body 12. The electric non-linear wave signal 26 may be detectable by the receiver assembly 24. The dispersion and nonlinear characteristics of the terrestrial body 12 can cancel one another out as an electrical signal is passed through the terrestrial body 12 to produce a propagating "pulse" electrical non-linear wave signal 26 that can travel over larger distances through the terrestrial body 12 to the receiver assembly 24 spaced from the transmitter 16. In some embodiments, the non-linear wave signal 26 propagated by the transmitter 16 through the terrestrial body 12 can resemble, mimic, or be representative of a soliton wave. In some embodiments, the non-linear wave signal 26 may include a conduction current over and through the terrestrial body 12.

Note that the Earth is used as an example of a terrestrial body 12, as applications and experiments have thus far been conducted on Earth. However, this does not exclude other terrestrial bodies such as other planets, moons, asteroids, etc. that could also serve as a terrestrial body 12.

Figure 7:
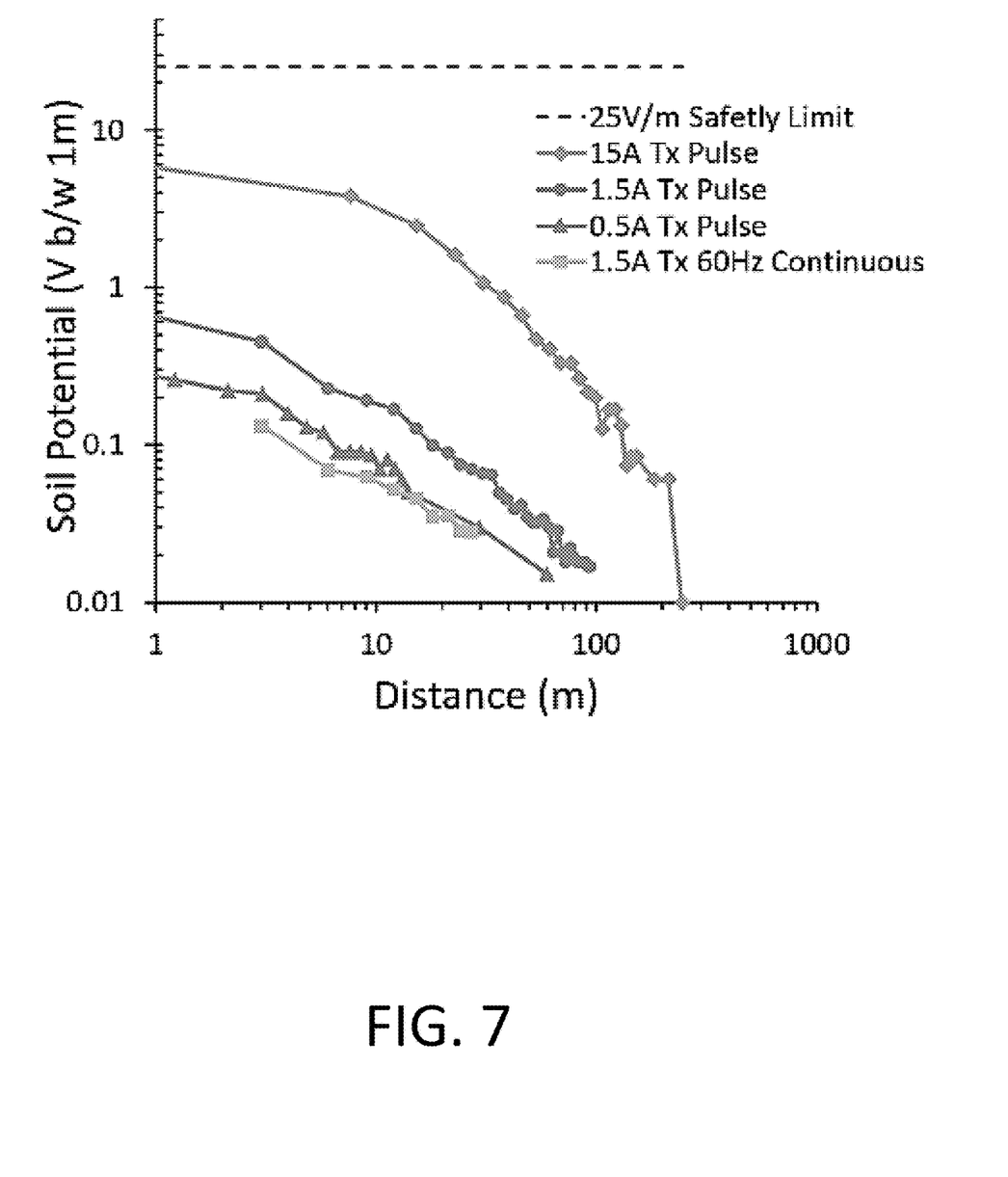
FIG. 7 is a graph from an experimental power transfer system incorporating the systems and methods of the present disclosure showing differential surface voltages as a function of the distance away from the transmitter at varying currents supplied to a transmitter of the system.

When power is supplied to the first and second electrodes 18, 20, a high intensity current pulse can be generated between the two electrodes 18, 20. The intensity of the pulse dictates the distance and speed of the non-linear wave signal 26 generated. FIG. 7 is a plot of the detected voltage versus distance for increasing current impulses. It can be seen that as the impulse current increases, the magnitude of the pulse of the non-linear wave signal 26 extends farther and diminishes lower in amplitude with distance. In some embodiments, the receiver assembly 24 can detect a voltage of at least 5 volts for the electric non-linear wave signal 26 when the receiver assembly 24 is spaced at least 3 meters from the transmitter 16 and an impulse current of 15 amps is provided to the transmitter 16. In some embodiments, the receiver assembly 24 can detect a voltage of at least 0.1 volts for the electric non-linear wave signal 26 when the receiver assembly 24 is spaced at least 3 meters from the transmitter 16 and an impulse current of 0.5 amps is provided to the transmitter 16. In some embodiments, the receiver assembly 24 can detect a voltage of at least 0.5 volts for the electric non-linear wave signal 26 when the receiver assembly 24 is spaced at least 3 meters from the transmitter 16 and an impulse current of 1.5 amps is provided to the transmitter 16. These threshold transmission values can represent the detection of a significant voltage signal at a relatively large distance from a transmission source with a relatively small impulse current applied to the transmitter 16. This can provide an advantage over some prior art systems that have seen some propagation of small voltage signals across large distances, but an extremely large current input, and thus power input, was required. In one embodiment, the potential voltage received by the transmitter 16 can modeled based on the following equation:

$$V_V \cong \frac{9I * d^4}{4\pi\sigma^5} \quad (2)$$

where I is the current that is being projected by the bottom electrode 20, σ is the conductivity of the soil surrounding the system, r is the distance between the transmitter 16 and receiving circuits, and d is the distance between the first and second electrodes 18, 20 of the transmitter 16.

In some embodiments, the at least one second electrode 20 can be spaced a vertical distance A downward from the first electrode 18. The vertical distance A may include the distance d from Equation 2. In some embodiments, the receiver assembly 24 can include a first receiver electrode 28 positioned proximate the upper surface 14 of the terrestrial body 12 and a least one second receiver electrode 30 positioned beneath the upper surface 14 of the terrestrial body 12 and spaced at the distance A from the first receiver electrode 28. The receiver assembly 24 may be operable to propagate a return electric non-linear wave signal 32 through the terrestrial body 12, the return electric non-linear wave signal 32 being detectable by the transmitter 16. Thus, a complete return path can be formed underground by using the soil or terrestrial body 12 as a conductive medium between the first and second electrode 18, 20 pairs of the transmitter 16 and the receiver assembly 24. In some embodiments, the distance between the first and second electrodes 18, 20 and the first and second receiver electrodes 28, 30 can be substantially equal.

In some embodiments, the distance between the first receiver electrode 28 and the at least one second receiver electrode 30 may be less than the distance A. This configuration of the distance between the first receiver electrode 28 and the at least one second receiver electrode 30 may be applicable to systems 10 where the transmitter 16 is operable to transmit in a low-power mode. In one embodiment, the distance between the first receiver electrode 28 and the at least one second receiver electrode 30 may be substantially equal to the distance A.

In some embodiments, the receiver assembly 24 can be a transceiver that can both receive an electric non-linear wave signal 26 from the transmitter 16 and provide a return non-linear wave signal 32 to the transmitter 16. In some embodiments, as shown in FIG. 1, the return non-linear wave signal 32 can be propagated through the terrestrial body 12 similarly to the non-linear wave signal 26 provided to the receiver assembly 24 by the transmitter 16.

In some embodiments, the power source 22 may include a geothermal heat pump (GHP), a solar panel array, a wind turbine, a hydroelectric generator, a power plant (which may generate power via fossil fuels or nuclear fission), a hydrogen fuel cell, a battery, or some other power source. The power source 22 may include a power outlet connected to one or more of the power source previously mentioned.

In some embodiments, the first electrode 18 may include a water well casing, an oil well casing, or some other type of well casing or other type of casing. The first electrode 18 may include a modified vertical ground heat pump tubing, and the second electrode 20 may include the chassis of a submersible pump, a steam-assisted gravity drainage tubing, a fracking tubing, or a modified vertical ground heat pump tubing.

In one embodiment, the power source 22 may include an electric inverter. The electric inverter may shape the power waveform into a high-intensity pulse. The high-intensity pulse may include the electrical non-linear wave signal 26. The electrical non-linear wave signal 26 may include a rapid conduction current that may propagate outward within the surrounding terrestrial body 12.

Figure 2:
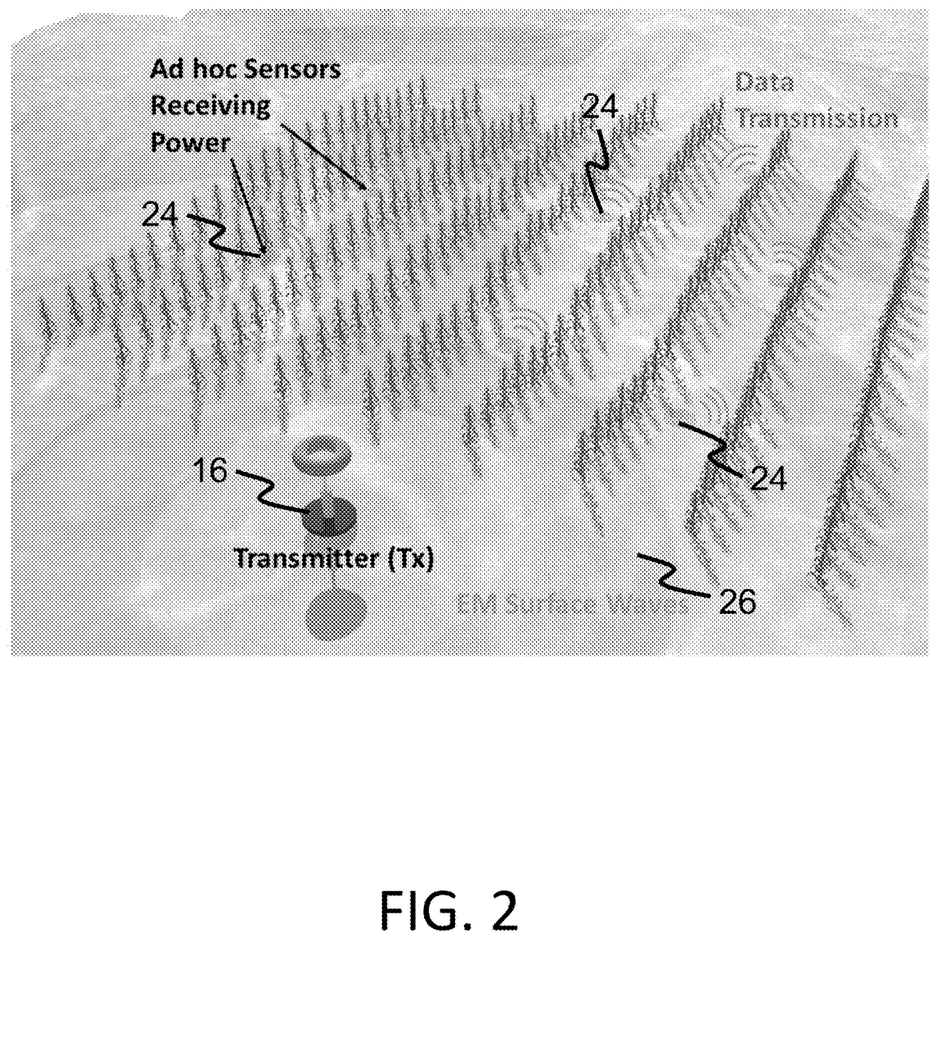
FIG. 2 is a perspective view of another embodiment of a system for transmitting power through a terrestrial body having one transmitter and multiple receiver/transceiver assemblies positioned in the transmission range of the transmitter.

FIG. 2 depicts another embodiment of the system 10. The system 10 may include one or more components depicted in FIG. 1 such as the transmitter 16, one or more receiver assemblies 24, or an electric non-linear wave signal 26. In some embodiments, the receiver assembly 24 can have additional hardware and control circuitry 34 which can be powered by the electrical non-linear wave signal 26 but which can include an above ground antenna for sending a wireless telemetry signal, such as a radio frequency signal back to the transmitter 16 or another source. For instance, in some embodiments, the receiver assembly 24 can be a sensing device that can be powered by the non-linear wave signal 26 and can include wireless telemetry circuitry that can provide a wireless communication signal back to the transmitter 16 or another source, as shown in FIG. 2.

Figure 3:
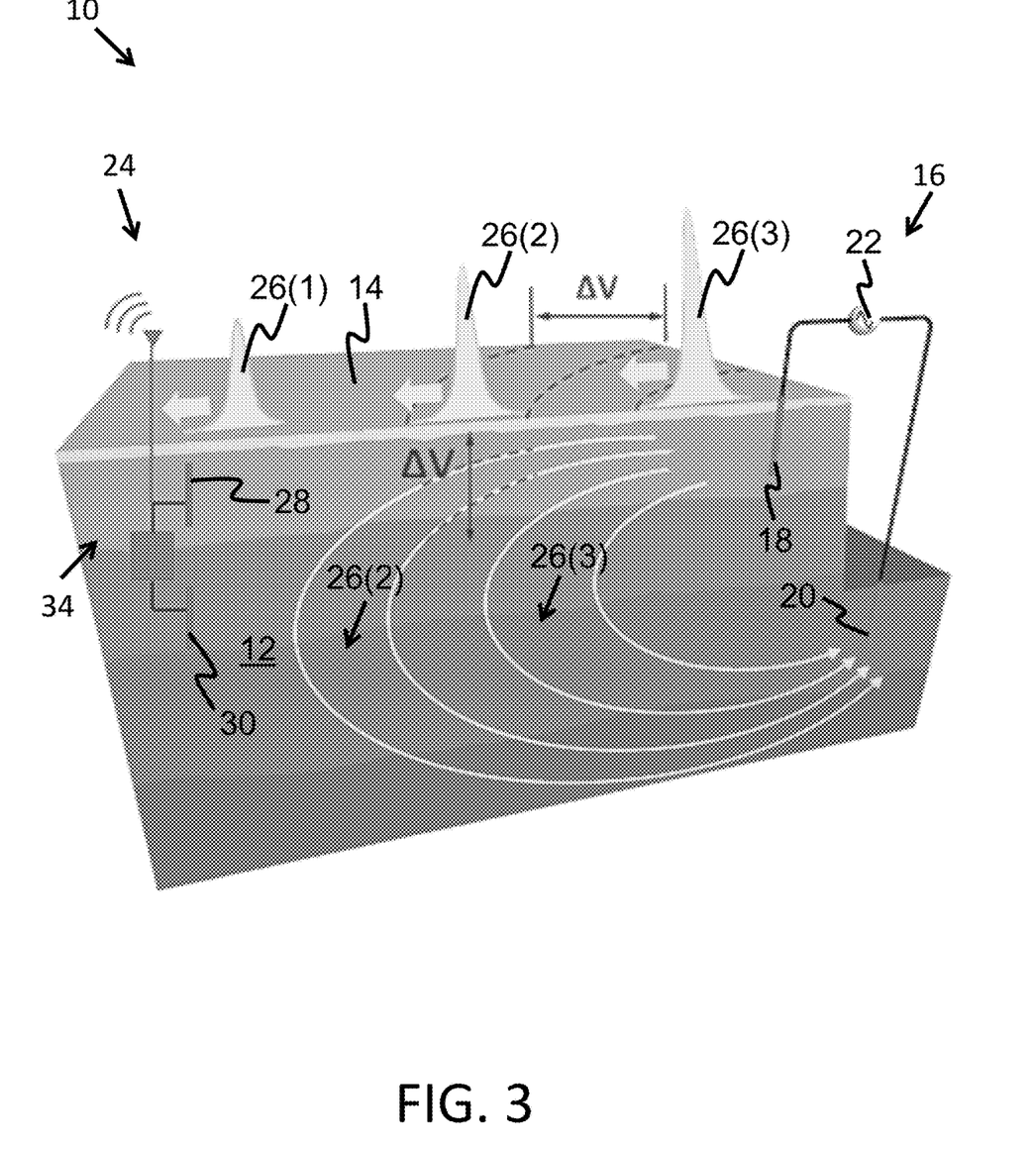
FIG. 3 is a cross sectional perspective view of a terrestrial body including another embodiment of a system for transmitting power through the terrestrial body having a transmitter and a receiver assembly spaced from the transmitter.

FIG. 3 depicts another embodiment of the system 10. The system 10 may include one or more components discussed previously with regards to FIG. 1 or FIG. 2 such as the terrestrial body 12 and its upper surface 14, the transmitter 16, the first and second electrodes 18, 20 of the transmitter 16, the power source 22, the receiver assembly 24, one or more electrical non-linear wave signals 26(1)-(3), the first and second receiver electrodes 28, 30. In some embodiments, the additional hardware and control circuitry 34 of the receiver assembly 24 may include a buried sensor. The buried sensor may receive signals from the first or second receiver electrodes 28 or 30. The additional hardware and control circuitry 34 may include an antenna that may transmit sensor data from the buried sensor. In some embodiments, the distance between two electrical non-linear wave signals 26(1)-(3) may include the potential difference LV in the terrestrial body 12.

Figure 4:
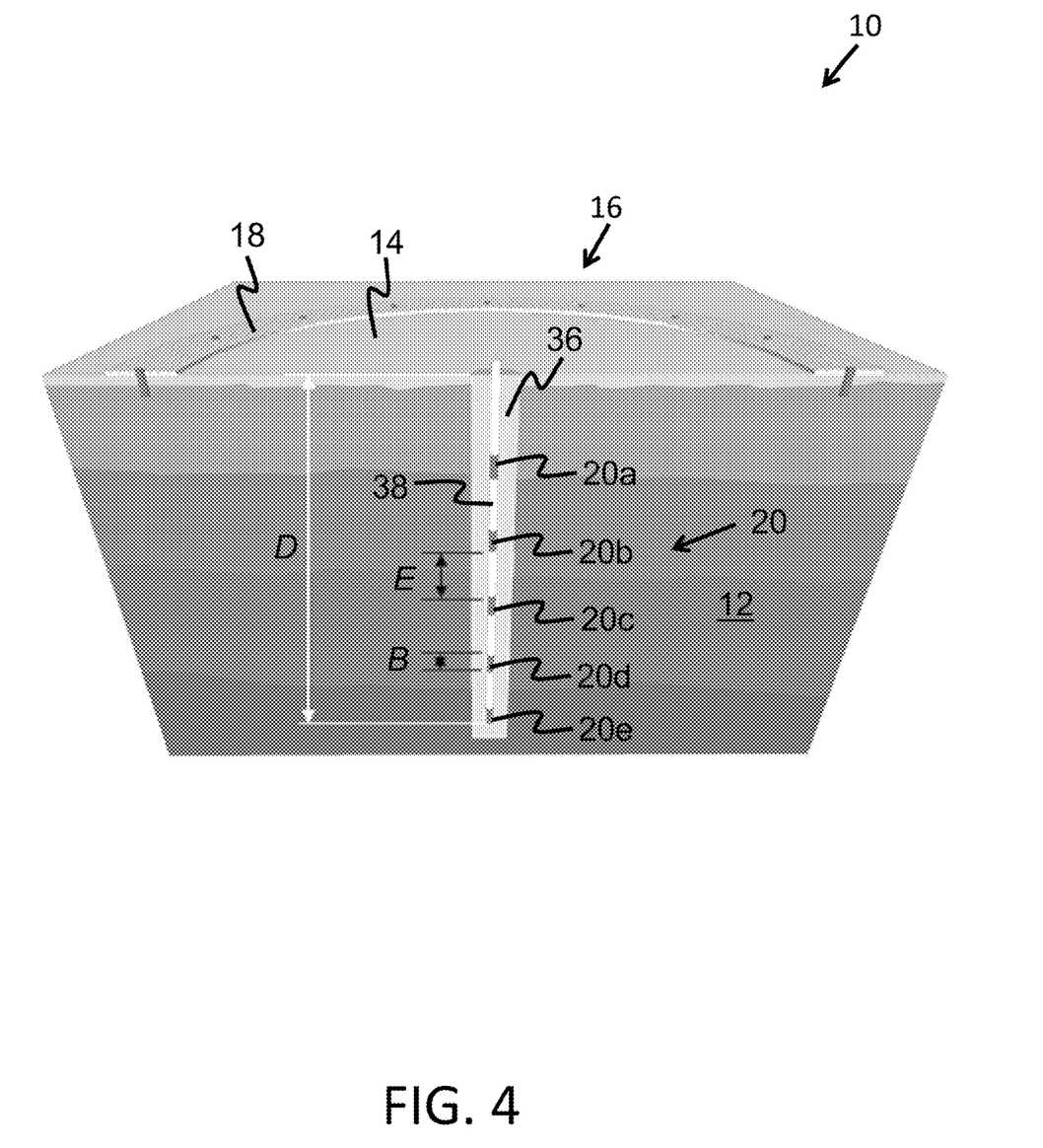
FIG. 4 is a cross sectional perspective view of another embodiment of a transmitter for a system of transmitting power through a terrestrial body.
Figure 5:
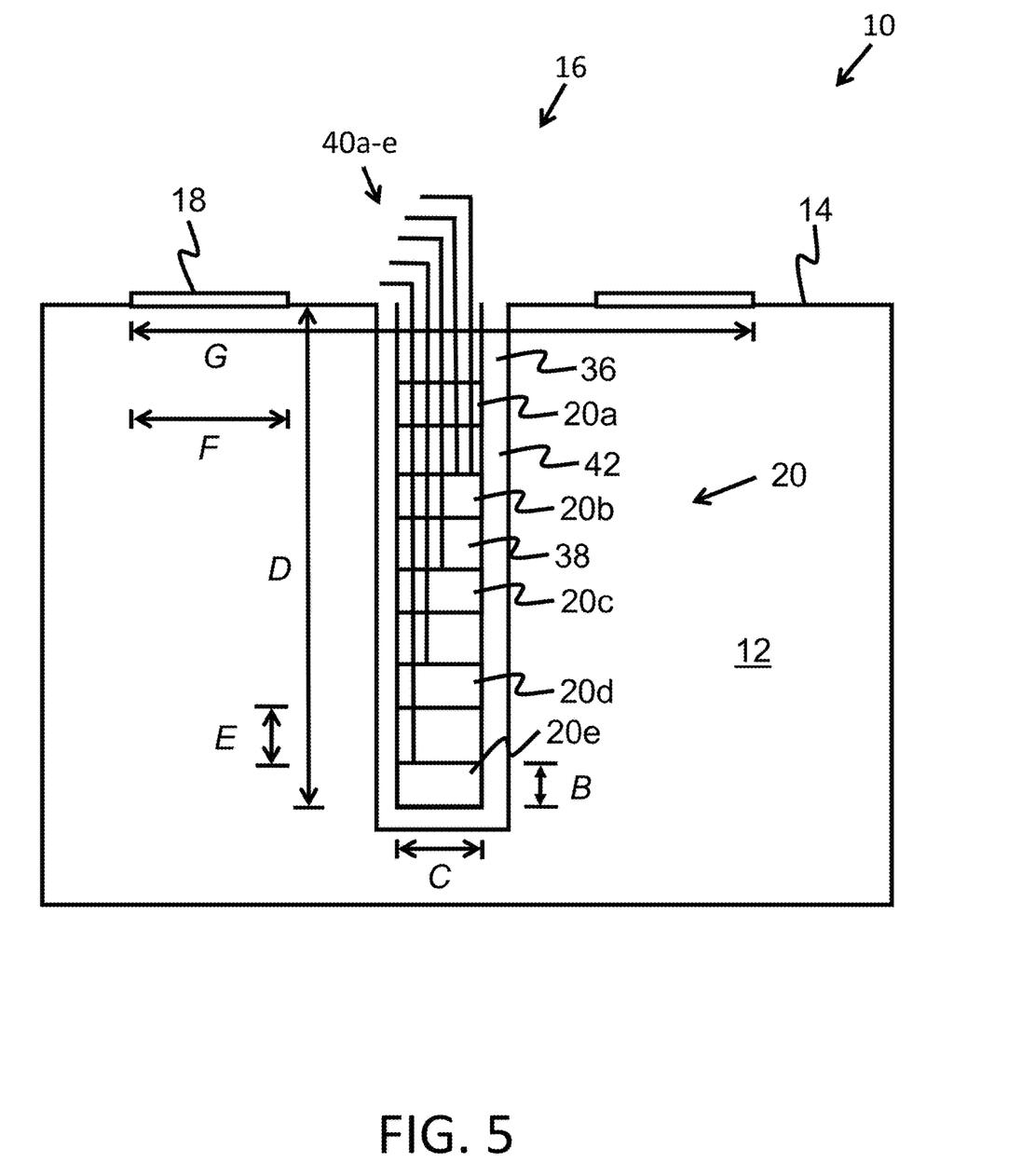
FIG. 5 is a detailed cross sectional view of the transmitter of FIG. 4.

FIG. 4 and FIG. 5 depict one embodiment of the system 10. The system 10 may include a transmitter 16. In some embodiments, the second or bottom electrodes 20 of the transmitter 16 can be buried in a bore well 36 beneath the upper surface 14 of the terrestrial body 12 such that the second electrodes 20 are bore electrodes having the shape of a cylinder or a cylindrical ring. In one embodiment, a second electrode 20 may include a height B. The height B can be between about 2 and 20 meters in some embodiments. A large surface area of the at least one second electrode 20 can produce larger current amplitudes in the resulting non-linear waves 26 propagated in the terrestrial body 12. Increasing the height B of the second electrode 20 can increase the surface area of the second electrode 20 while helping to minimize the width or diameter C of the second electrode 20 and, in some embodiments, the width of the bore well 36 that would need to be drilled to accommodate the second electrode 20. In some embodiments, the width or diameter C of the second electrode 20 and, thus, the bore well 36 can be less than 0.3 meters. In one or more embodiments, the width of the bore hole may be different that the width or diameter C of the second electrode 20.

In some embodiments, the system 10 may include multiple bore wells 36. One or more of the bore wells 36 may be similar to the bore well depicted in FIG. 3, FIG. 4, or FIG. 5. A bore well 36 may be connected to a power source 22. The multiple bore wells 36, together, may form part of a large transmitter 16. The transmitter 16 may include very low electrical impedance between the multiple first electrodes 18 and the multiple second electrodes 20.

Figure 6:
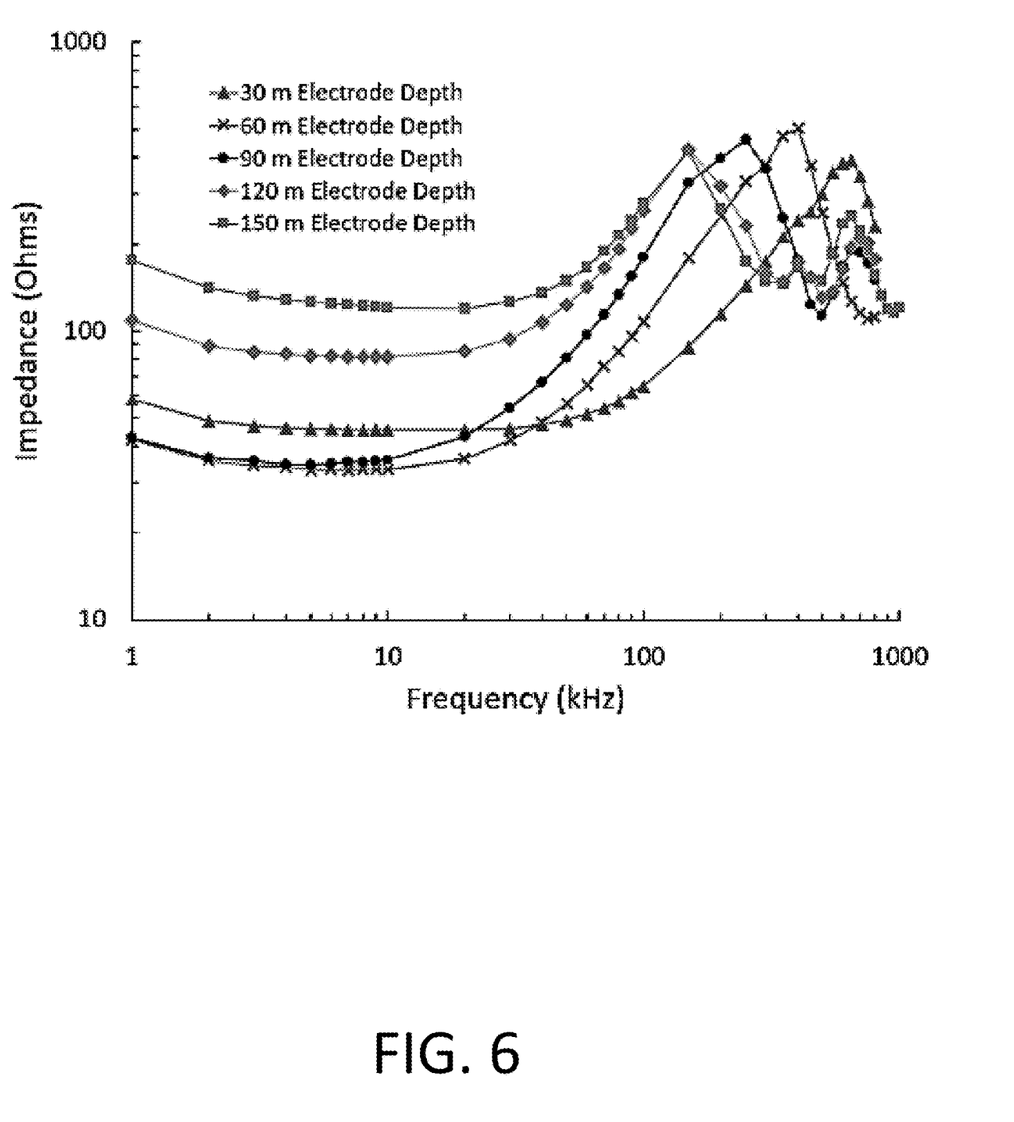
FIG. 6 is a graph of the resistance of the transmitter with the second electrode positioned at varying depths and operating at varying electrical frequencies.

In the optimum case, the impedance of the first electrode 18 and the second electrode 20 should be as low as possible in order to promote as high a current density as possible with the lowest amount of joule heating loss (i.e., resistive losses due to the terrestrial medium's 12 conductivity). As shown in FIG. 6, it has been found that the depth D of the second electrode 20 beneath the first electrode 18 can affect the impedance of the transmitter 16 and, thus, the current amplitude of the non-linear wave signal 26 produced by the transmitter 16 at a consistent voltage input. For one experimental environment, the impedance of the transmitter 16 was generally lower when the second electrode 20 was positioned at a depth D of between about 30 and 90 meters beneath the upper surface 14 of the terrestrial body 12 and the first electrode 18, with the impedance generally lowest at a depth D of about 60 meters. In some embodiments, a deeper at least one second electrode 20 positioned at a depth D of 120 and 150 meters may show a greater impedance as the depth D gets lower into the terrestrial body 12. The increased impedance at greater depths D may be caused by the water table levels or conductive properties or material composition of the terrestrial body 12 at the further depths. However, depending on the soil environment at a particular location, optimal second electrode 20 depths D may vary from location to location.

In some embodiments, as shown in FIG. 4 and FIG. 5, the at least one second electrode 20 can include a plurality of second electrodes 20. The plurality of second electrodes 20 may include five second electrodes 20a, 20b, 20c, 20d, and 20e disposed below a height of the first electrode 18. The plurality of second electrodes 20a, 20b, 20c, 20d, and 20e can be spaced apart from one another at varying distances E. In one embodiment, the distance E between to second electrodes 20 may include 30 meters. Power can be supplied to each of the second electrodes 20a, 20b, 20c, 20d, and 20e. In some embodiments, the at least one second electrode 20 may include more than five second electrodes or fewer than five second electrodes.

In one embodiment, as shown in FIG. 5, the transmitter 16 can have a depth D. The depth D may include a distance between about 150 and 180 meters. The second electrodes 20a, 20b, 20c, 20d, and 20e may each include a diameter C of between about 0.1 and 0.5 meters. In one embodiment, each second electrode 20a, 20b, 20c, 20d, or 20e may include a vertical brass pipe of a height B. The height B may include approximately 2 meters. The second electrodes 20a, 20b, 20c, 20d, and 20e may be separated from each other by long increments of insulated plastic tubing sections 38. A insulated plastic tubing section 38 may include a height E. Each second electrode 20a, 20b, 20c, 20d, or 20e may be connected to the power source 22 at the surface 14 by a high-insulated copper wire 40a, 40b, 40c, 40d, 40e. In some embodiments, the depths D of the second electrodes 20a, 20b, 20c, 20d, and 20e can be from 20-50 meters, 51-80 meters, 81-110 meters, 111-140 meters, and 141-170 meters, respectively, with the insulated plastic tubing sections 38 having lengths E of about 25-35 meters. Varying depths D for the second electrodes 20a, 20b, 20c, 20d, or 20e can be used depending on the terrestrial body 12 environment. In other embodiments, the height B of a second electrode 20a, 20b, 20c, 20d, or 20e could include a height between 2 and 20 meters. In such instances, the heights E of the plastic tubing section 38 between the brass pipes 20 may include a height between about 10 and 30 meters. In some embodiments, the bore well 36 of the transmitter 16 can be filled with bentonite clay 42. The bentonite clay 42 may include varying electrical conductivity. The bentonite clay 42 may protect the water table from being contaminated. Lastly, the first electrode 18 proximate the surface 14 of the terrestrial body 12 can be a galvanized steel mesh that may include a width F. The width F may include a width of approximately 0.75 to 1.25 meters. In some embodiments, the first electrode 18 may include a diameter G. The diameter G may include a diameter of approximately 16-20 meters. The bore well 36, and thus, the second electrodes 20a, 20b, 20c, 20d, and 20e, may be disposed at the center of the diameter G.

Having a transmitter 16 with multiple second electrodes 20 at varying depths can help avoid the need to test for an optimal depth of the second electrode 20 at a particular location. One or more of the second electrodes 20 can provide adequately low impedance and, thus, higher current transmission of the non-linear wave signal 26 once the transmitter 16 is installed in the ground and a pulse wave power signal is supplied to the transmitter 16 to achieve the desired power transmission to the receiver assembly 24.

The frequency of the electrical impulse signal provided to the transmitter 16 can also affect the impedance of the transmitter 16 and, thus, the current amplitude of the electrical non-linear wave signal 26. As shown in FIG. 6, impedance is lower at frequencies of between about 1 and 50 kHz. In some embodiments, a frequency of between about 25 and 35 kHz has been found to optimize the impedance of the transmitter 16.

In some embodiments, the power source 22 or other circuitry the transmitter 16 may include may modulate the pulse repetition rate at a particular lower frequency. This may enable the build-up of energy in a tuned resonant circuit at the receiver 24.

Figure 8:
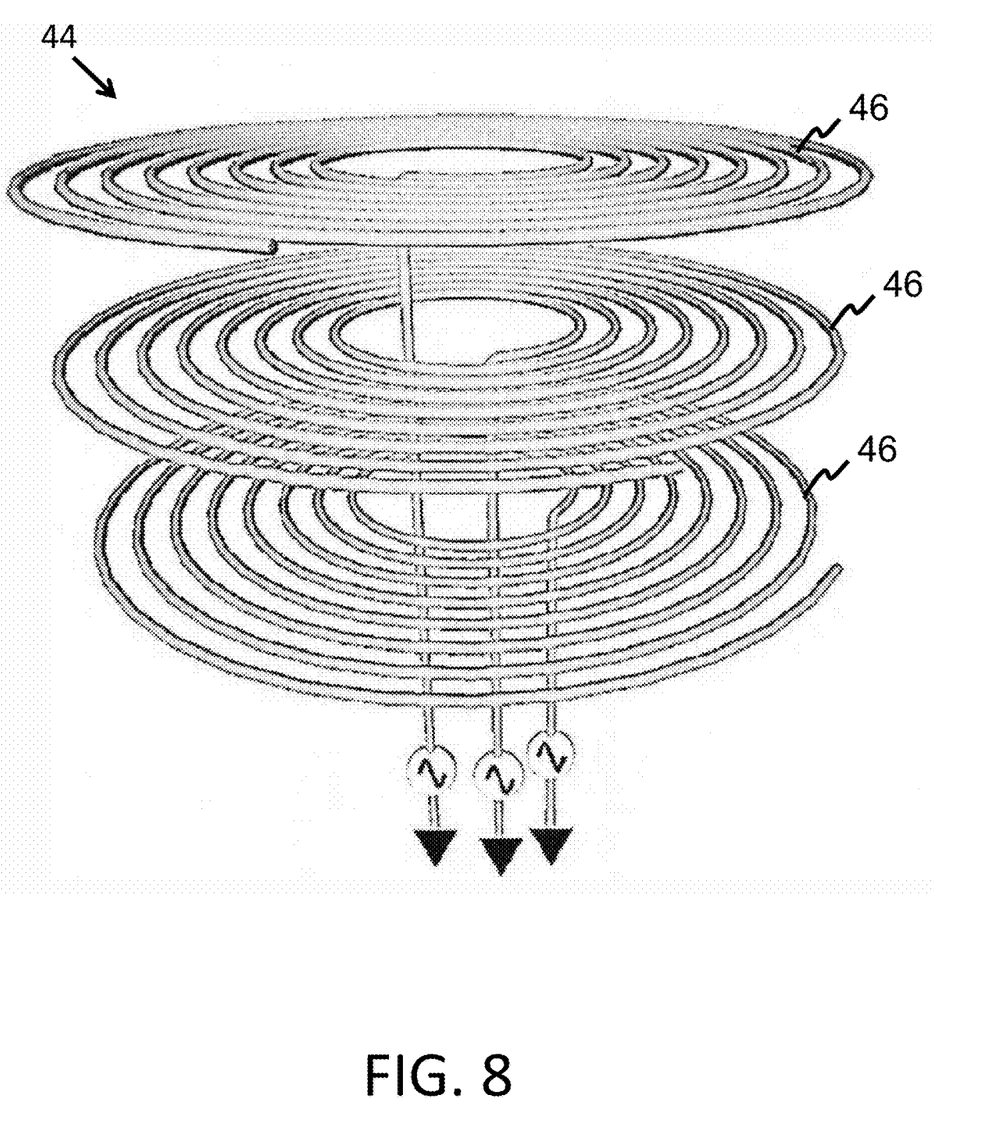
FIG. 8 is a perspective view of an embodiment of a resonant antenna that can be utilized with the transmitter of FIGS. 1-4.

In some embodiments, as shown in FIG. 8, the system 10 may include a resonant antenna 44. The first electrode 18 may include the resonant antenna 44. The first receiver electrode 28 may include the resonant antenna 44. In some embodiments, the resonant antenna 44 may be elevated and extend above the terrestrial body's 12 upper surface 14. In one embodiment, the resonant antenna 44 may function as a tuned circuit at the receiver 24 for building up the transmitted pulse energy and improving the maximum power transfer.

In one embodiment, the resonant antenna 44 may include one or more coil sections 46. Each coil section 46 may include a resonant frequency (f). The resonant frequency of a certain coil section 46 may be a multiple of the resonant frequency of the proceeding coil section 46. One or more power sources 22 may excite a coil section 46 that contains the same frequency as that coil section's 46 resonant frequency. When a coil section 46 is excited at its resonant frequency, the resonant antenna 44 may produce a standing wave in that coil section 46. The electric and magnetic field of the standing wave in the coil sections 46 may superimpose to create a Fourier summation of the fields. Thus, the total waveform of the resonant antenna 44 may not include a sine wave (as is the case of prior art antennas) but may include a shape defined by the summation of one or more of the coil sections 46 following a Fourier series. This resonant antenna 44 may create extremely high voltage electric field impulses that may further increase the impulse excitation to produce non-linear wavers within the terrestrial body 12.

Figure 9:
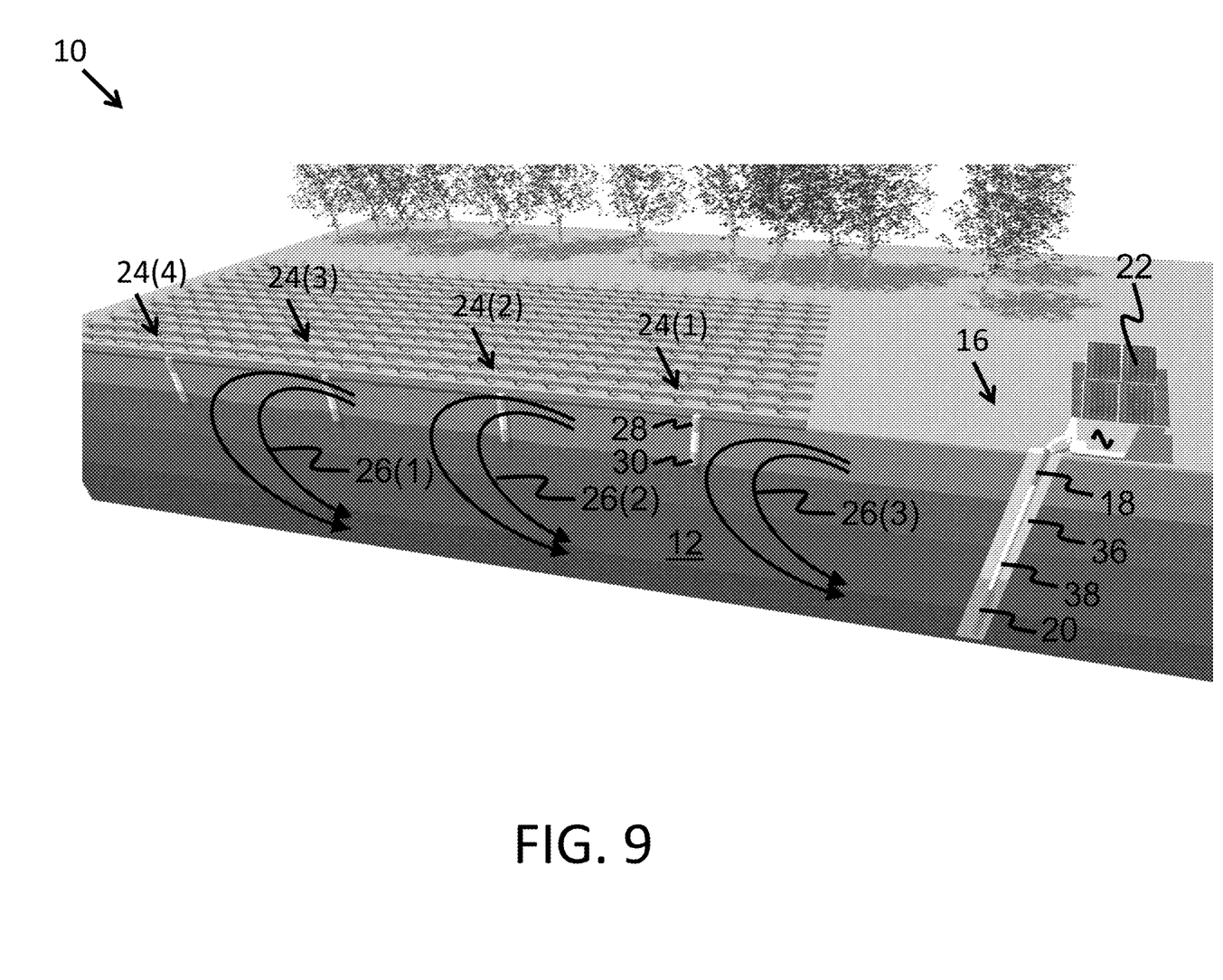
FIG. 9 is a cross sectional perspective view of a terrestrial body including another embodiment of a system for transmitting power through the terrestrial body having a transmitter and multiple receiver assemblies.

FIG. 9 depicts one embodiment of the system 10. The system 10 may include one or more components as have been described previously as being included in the system 10. For example, the system 10 of FIG. 9 may include a transmitter 16 with its respective first electrode 18, second electrode 20, power source 22 bore well 36, insulated plastic tubing section 38. The system 10 may include one or more receiver assemblies 24(1)-(4). Each receiver assembly 24 may include its respective first receiver electrode 28 and second receiver electrode 30. In some embodiments, an insulated plastic tubing section 38 may be disposed between the first and second receiver electrodes 28, 30.

As can be seen in FIG. 9, the power source 22 may include a solar panel array and may include an inverter. As can also be seen, in some embodiments, the first and second receiver electrodes 28, 30 of one or more of the receiver assemblies 24(1)-(4) may form a line with the transmitter's 16 first and second electrodes 18, 20.

Figure 10:
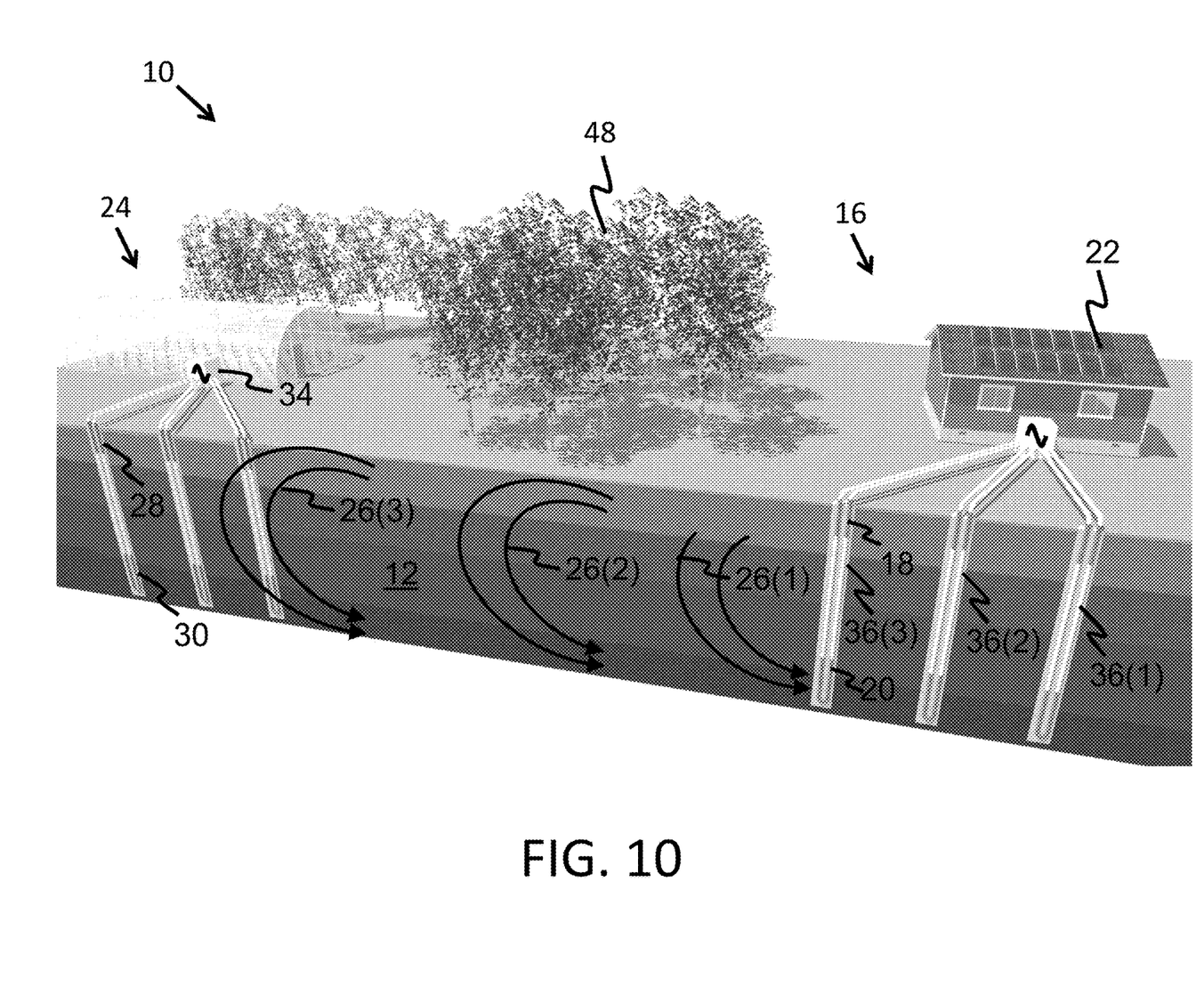
FIG. 10 is a cross sectional perspective view of a terrestrial body including another embodiment of a system for transmitting power through the terrestrial body having a transmitter and a receiver assembly spaced from the transmitter.

FIG. 10 depicts one embodiment of the system 10. In one embodiment, the system 10 may include a transmitter 16. The transmitter 16 may include a power source 22 (e.g., as depicted in FIG. 10, a solar panel array). The transmitter 16 may include multiple bore wells 36(1)-(3). For example, as depicted in FIG. 10, the transmitter 16 may include a first bore well 36(1), which may include a first vertical ground heat exchanger (VGHE). The transmitter may include a second bore well 36(2), which may include a second VGHE. The power source 22 may connect to an inverter and may supply power to the first electrode 18 and the second electrode 20 of the transmitter 16.

As can be seen in FIG. 10, in some embodiments, the transmitter 16 may include a U-tube. The U-tube may include the first electrode 18 and the second electrode 20. A U-tube may include an assembly that includes two separate vertical shafts and a U-shaped connection that form a U-shaped configuration. The first electrode 18 may include two separate electrodes each disposed near the top of a shaft of the U-tube, and the second electrode 20 may include a U-shaped electrode disposed at the bottom of the shafts that forms the U-shaped connection. In some embodiments, the U-tube may include a high-density polyethylene (HDPE). The HDPE may include one or more wires (such as the copper wire 40) disposed outside the HDPE to supply power to the first and second electrodes 18, 20. In one embodiment, the transmitter 16 may include multiple U-tubes that may include the first and second electrodes 18, 20. The U-tube may be disposed in a bore well 36 (e.g., as shown in FIG. 10, the third bore well 36(3)).

As can also be seen in FIG. 10, the receiver assembly 24 may include one or more bore wells 36. A bore well 36 of the receiver assembly 24 may include a VGHE. A bore well 36 of the receiver assembly may include a U-tube. The U-tube of the receiver assembly 24 may be similar to the U-tube of the transmitter 16, except the U-tube of the receiver assembly 24 may include the first and second receiver electrodes 28, 30. Furthermore, as depicted in FIG. 10, the receiver assembly 24 may include multiple U-tubes.

In some embodiments, the transmitter 16 or receiver assembly 24 may include one or more U-tubes because the transmitter 16 or receiver assembly 24 geometries may be very similar to the geometry used in commercial VGHEs. This may allow the easy integration of long-range wireless power transfer technology into a VGHE installation. The dual functionality of the transmitter 16 or receiver assembly 24 and VGHE system may enhance construction efficiency and offer a way to supply power to buildings in remote areas.

As can be seen in FIG. 10, in some embodiments, an obstacle 48 may be disposed between the transmitter 16 and the receiver assembly 24. The obstacle 48 may obscure a line of sight between the transmitter 16 and the receiver assembly 24. However, because the non-linear wave signals 26(1)-

(3) travel through the terrestrial body 12, the obstacle 48 does not interfere with the wireless power transfer of the system 10.

In one or more embodiments, the power provided from non-linear wave signals 26 may power components associated with the respective transmitter 16 or receiver assembly 24. For example, power generated from non-linear wave signals 26 received by the receiver assembly 24 may power components of a greenhouse (e.g., lighting, sensors, etc.) that may be electrically connected to the receiver assembly. Power generated from non-linear wave signals 26 received by the receiver assembly 24 may power VGHE components (e.g., pumps). Power generated from non-linear wave signals 26 received by the transmitter assembly 16 may power VGHE components electrically connected to the transmitter 16.

In some embodiments, other EM wave phenomena (space waves, surface waves, etc.) are used to generate the non-linear wave signals 26 through secondary processes. In one or more embodiments, the transmitter 16 and/or receiver 24 electrode 18, 20, 28, 30 configuration can be utilized to harvest or collect electrical power from the terrestrial body 12 or from telluric currents propagated through the terrestrial body 12. The telluric currents can be a result of man-made or natural causes. For instance, stray electrical signals from buried or surface power lines, lightning strikes, the terrestrial geoelectric circuit, or other sources of electrical energy may propagate through the terrestrial body 12. The harvesting of such electrical signals and electrical power via the electrode 18, 20, 28, 30 setup of the system 10 can help offset the power requirements needed to transmit adequate power via the transmitter 16/receiver 24 setup through the terrestrial body 12.

The systems and methods of the disclosure overcome the disadvantages of prior efforts at wireless power transfer over long distances. With the majority of the electrical non-linear wave signal 26 propagating at or below the surface 14, such non-linear wave signals 26 are safe for living beings on the surface 14. Furthermore, environmental factors, such as weather or birds, do not interfere with the electrical non-linear wave signals 26. Changes in conductivity, such as changes from a building's foundation rebar, soil strata, etc., within a geological strata layer generally occur horizontally. Thus, such changes in conductivity may not shunt the flow of the non-linear wave signals 26. Furthermore, the non-linear wave signals 26 travel along the surface 14 contours (e.g., up slopes, down into valleys, etc.). This allows for potential surface coupling effects as the electrical non-linear wave signals 26 travel outwards from the transmitter 16. This also allows the transmitter 16 and the receiver 24 to function even when they are not within line-of-sight of each other.

Thus, although there have been described particular embodiments of the present invention of a new and useful METHOD AND SYSTEM FOR GENERATING ELECTRIC BASED NON-LINEAR WAVES IN NATURAL TERRESTRIAL ENVIRONMENTS, it is not intended that such references be construed as limitations upon the scope of this invention.

What is claimed is:

1. A system for transmitting electrical signals through a terrestrial body, the terrestrial body having an upper surface, the system comprising:
    a transmitter including
        a first electrode positioned on or beneath the upper surface of the terrestrial body, and
        at least one second electrode positioned beneath the upper surface of the terrestrial body and spaced a vertical distance downward from the first electrode;
    a power source operable to supply power to the first electrode and the at least one second electrode; and
    a receiver assembly spaced away from the transmitter;
    wherein when power is supplied to the transmitter, the transmitter is operable to propagate an electric non-linear wave signal through the terrestrial body, wherein the receiver assembly is operable to detect the electric non-linear wave signal; and
    wherein at least one of the transmitter or the receiver assembly further comprises a resonant antenna extending above the upper surface of the terrestrial body, wherein the resonant antenna includes at least two resonant coil sections, and wherein the resonant coil sections include different resonant frequencies.

2. The system of claim 1, wherein the receiver assembly comprises a transceiver assembly operable to:
    detect the electric non-linear wave signal; and
    further transmit a receiver transmission signal in response to receiving the electric non-linear wave signal.

3. The system of claim 2, wherein the receiver assembly comprises:
    a first receiver electrode positioned on or beneath the upper surface of the terrestrial body; and
    at least one second receiver electrode positioned beneath the upper surface of the terrestrial body and spaced a vertical distance downward from the first receiver electrode, wherein the receiver assembly is operable to propagate a return electric non-linear wave signal through the terrestrial body, and wherein the transmitter is further operable to detect the return electric non-linear wave signal.

4. The system of claim 1, wherein the resonant coil sections are powered independently of one another at their resonant frequencies.

5. The system of claim 1, wherein each resonant frequency is operable to produce a Fourier sum.

6. The system of claim 1, wherein the second electrode includes a height of between 2 meters and 20 meters.

7. The system of claim 1, wherein the second electrode is spaced beneath the first electrode by a distance of between 30 and 170 meters.

8. The system of claim 1, wherein at least a portion of the receiver assembly is disposed on the upper surface of the terrestrial body.

9. The system of claim 1, wherein at least a portion of the receiver assembly is disposed beneath the upper surface of the terrestrial body.

10. A method for transmitting electrical signals through a terrestrial body, the terrestrial body having an upper surface, the method comprising:
    disposing a first electrode of a transmitter on or beneath the upper surface of the terrestrial body;
    disposing at least one second electrode beneath the upper surface of the terrestrial body and spaced a vertical distance downward from the first electrode;
    disposing a receiver assembly spaced away from the transmitter;
    supplying power from a power source to the first electrode and the at least one second electrode of the transmitter;
    propagating, via the transmitter, an electric non-linear wave signal through the terrestrial body;
    detecting, via the receiver assembly, the electric non-linear wave signal; and detecting, via the receiver assembly, a voltage of at least 5 volts for the electric non-linear wave signal in response to:
  the receiver assembly being spaced at least 3 meters from the transmitter; and
  the transmitter receiving a current of 15 amps.

11. The method of claim 10, further comprising:
propagating, via the receiver assembly, a return electric non-linear wave signal through the terrestrial body; and
detecting, via the transmitter, the return electric non-linear wave signal.

* * * * *